United States Patent
Thorn et al.

(10) Patent No.: US 8,101,786 B2
(45) Date of Patent: Jan. 24, 2012

(54) ENERGY EFFICIENT SYNTHESIS OF BORANES

(75) Inventors: David L Thorn, Los Alamos, NM (US); William Tumas, Los Alamos, NM (US); Daniel E Schwarz, Los Alamos, NM (US); Anthony K Burrell, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 12/914,595

(22) Filed: Oct. 28, 2010

(65) Prior Publication Data

US 2011/0105706 A1    May 5, 2011

Related U.S. Application Data

(62) Division of application No. 12/533,736, filed on Jul. 31, 2009, now Pat. No. 7,837,852, which is a division of application No. 11/704,494, filed on Feb. 8, 2007, now abandoned.

(51) Int. Cl.
*C01B 6/24* (2006.01)
*C08G 79/08* (2006.01)

(52) U.S. Cl. ......... 556/95; 423/644; 528/394; 556/104

(58) Field of Classification Search ............... 528/394; 423/276–297, 645, 644; 556/95, 104
See application file for complete search history.

(56) References Cited

U.S. PATENT DOCUMENTS 3,726,906 A * 4/1973 Reifenberg et al. ............. 556/82
6,524,542 B2 * 2/2003 Amendola et al. ........... 423/286
6,670,444 B2 * 12/2003 Amendola et al. ........... 528/394

OTHER PUBLICATIONS

Hodoshima et al., "Catalytic Decalin Dehydrogenation/Naphthalene Hydrogenation Pair as a Hydrogen Source for Fuel-Cell Vehicle," Int. J. Hydrogen Energy, vol. 28, Nov. 2003, pp. 1255-1262.
Ohara et al., "The Preparation of Trialkyltin Hydrides by Thermal Decomposition of Formates," vol. 3, 1965, pp. 484-485.
Attridge et al, "Stereochemstry of the Reduction of Boron Trichlorid by an Optically Active Silane," Chem. Comm., No. 24, 1966, p. 911.
Newsom et al., "Tributyltin Hydride Reduction of Chloroboranes," Inorg. Chem., vol. 7, No. 1, Jan. 1968, pp. 177-178.
Klingler et al, "Thermodynamics for the Addition of a Tin Hydride to Carbon Dioxide," Organometallics, vol. 4, No. 10, 1985, pp. 1893-1894.

* cited by examiner

*Primary Examiner* — Stuart Hendrickson
*Assistant Examiner* — Syed Iqbal
(74) *Attorney, Agent, or Firm* — Samuel L. Borkowsky

(57) ABSTRACT

The reaction of halo-boron compounds (B—X compounds, compounds having one or more boron-halogen bonds) with silanes provides boranes (B—H compounds, compounds having one or more B—H bonds) and halosilanes. Inorganic hydrides, such as surface-bound silane hydrides (Si—H) react with B—X compounds to form B—H compounds and surface-bound halosilanes. The surface bound halosilanes are converted back to surface-bound silanes electrochemically. Halo-boron compounds react with stannanes (tin compounds having a Sn—H bond) to form boranes and halostannanes (tin compounds having a Sn—X bond). The halostannanes are converted back to stannanes electrochemically or by the thermolysis of Sn-formate compounds. When the halo-boron compound is $BCl_3$, the B—H compound is $B_2H_6$, and where the reducing potential is provided electrochemically or by the thermolysis of formate.

4 Claims, 2 Drawing Sheets

ENERGY EFFICIENT SYNTHESIS OF BORANES

RELATED APPLICATIONS

This application is copending with U.S. patent application Ser. No. 12/533,736 filed Jul. 31, 2009, now allowed, which is a divisional of copending U.S. patent application Ser. No. 11/704,494 entitled "Enemy Efficient Synthesis of Boranes" filed Feb. 8, 2007, now abandoned, which claimed the benefit of U.S. Provisional Patent Application No. 60/771,739, filed Feb. 8, 2006 and entitled "Energy Efficient Synthesis of Boranes," all of which are incorporated by reference herein.

STATEMENT REGARDING FEDERAL RIGHTS

This invention was made with government support under Contract No. DE-AC51-06NA25396 awarded by the U.S. Department of Energy. The government has certain rights in the invention.

FIELD OF THE INVENTION

The present invention relates generally to hydrogen storage, and more particularly to an energy efficient synthesis of boranes (boron compounds having at least one B—H bond).

BACKGROUND OF THE INVENTION

Hydrogen ($H_2$) is currently the leading candidate for a fuel to replace gasoline/diesel fuel in powering the nation's transportation fleet. There are a number of difficulties and technological barriers associated with hydrogen that must be solved in order to realize this "hydrogen economy". Inadequate storage systems for on-board transportation hydrogen are recognized as a major technological barrier (see, for example, "The Hydrogen Economy: Opportunities, Costs, Barriers, and R&D Needs," National Academy of Engineering (NAE), Board on Energy and Environmental Systems, National Academy Press (2004).

One of the general schemes for storing hydrogen relates to using a chemical compound or system that undergoes a chemical reaction to evolve One of the general schemes for storing hydrogen relates to using a chemical compound or system that undergoes a chemical reaction to evolve hydrogen as a reaction product. In principle, this chemical storage system is attractive, but systems that have been developed to date involve either: (a) hydrolysis of high-energy inorganic compounds where the evolution of hydrogen is very exothermic (sodium borohydride/water as in the Millennium Cell's HYDROGEN ON DEMAND®, and lithium (or magnesium) hydride as in SAFE HYDROGEN®, for example), thus making the cost of preparing the inorganic compound(s) high and life-cycle efficiency low; or (b) dehydrogenation of inorganic hydride materials (such as $Na_3AlH_6/NaAlH_4$, for example) that release hydrogen when warmed but that typically have inadequate mass storage capacity and inadequate refueling rates.

Inorganic compounds referred to in (a), above, produce hydrogen according to the chemical reaction $$MH_x + xH_2O \rightarrow M(OH)_x + xH_2 \quad (1)$$

where $MH_x$ is a metal hydride, and $M(OH)_x$ is a metal hydroxide. This reaction is irreversible.

Inorganic hydride materials referred to in (b), above, produce hydrogen according to the following chemical reaction, which is reversible with $H_2$ (hydrogen gas):

$$MH_x = M + x/2 H_2 \quad (2)$$

where $MH_x$ is a metal hydride, M is metal and $H_2$ is hydrogen gas. By contrast to the first reaction, which is irreversible with $H_2$, the second reaction is reversible with $H_2$.

A practical chemical system that evolves hydrogen yet does not suffer the aforementioned inadequacies would be important to the planned transportation sector of the hydrogen economy. This same practical chemical system would also be extremely valuable for non-transportation $H_2$ fuel cell systems, such as those employed in laptop computers and other portable electronic devices, and in small mechanical devices such as lawnmowers where current technology causes significant pollution concerns.

Any heat that must be input to evolve the hydrogen represents an energy loss at the point of use, and any heat that is evolved along with the hydrogen represents an energy loss where the chemical storage medium is regenerated. Either way, energy is lost, which diminishes the life-cycle efficiency. For most organic compounds, such as in those shown in equations 3-5 below, hydrogen evolution reactions are very endothermic, and the compounds are incompetent to evolve hydrogen at ambient temperature (i.e. thermodynamically incapable of evolving $H_2$ at significant pressure at ambient temperature). For temperatures less than about 250-400 degrees Celsius, the equilibrium pressure of hydrogen over most organic compounds is very small. As a consequence, most common organic compounds require heating above about 250 degrees Celsius, and the continual input of high-grade heat to maintain this temperature, in order to evolve hydrogen at a useful pressure.

$$CH_4 \rightarrow C + 2H_2 \, \Delta H^0 = +18 \text{ kcal/mol}$$

$$\Delta G^0 = +12 \text{ kcal/mol} \quad (3)$$

$$6CH_4 \rightarrow \text{cyclohexane} + 6H_2 \, \Delta H^0 = +69 \text{ kcal/mol}$$

$$\Delta G^0 = +78 \text{ kcal/mol} \quad (4)$$

$$\text{cyclohexane} \rightarrow \text{benzene} + 3H_2 \, \Delta H^0 = +49 \text{ kcal/mol}$$

$$\Delta G^0 = +23 \text{ kcal/mol} \quad (5)$$

Most organic compounds have hydrogen evolution reactions that are endergonic (i.e. having a net positive standard free energy of reaction change, i.e. $\Delta G^0 > 0$) and their ambient temperature equilibrium hydrogen pressure is very low, practically unobservable. Thus, most organic compounds are unsuitable for hydrogen storage, based on both life-cycle energy efficiency and delivery pressure considerations. Decalin, for example, evolves hydrogen to form naphthalene when heated to about 250 degrees Celsius in the presence of a catalyst (see, for example, Hodoshima et al. in "Catalytic Decalin Dehydrogenation/Naphthalene Hydrogenation Pair as a Hydrogen Source for Fuel-Cell Vehicle," Int. J. Hydrogen Energy (2003) vol. 28, pp. 1255-1262, incorporated by reference herein). Hodoshima et al use a superheated "thin film" reactor that operates at a temperature of at least 280 degrees Celsius to produce hydrogen from decalin at an adequate rate and pressure. Thus, this endothermic hydrogen evolution reaction requires both a complex apparatus and high-grade heat, which diminishes the life-cycle energy efficiency for hydrogen storage.

Boranes have high hydrogen storage capacities and have attracted interest for use as hydrogen storage materials for transportation, but the difficulty of manufacturing borane compounds, and the life-cycle energy inefficiency of the chemical process presently used for their manufacture, has prevented their widespread use.

Owing to its commercial availability, $NaBH_4$ (sodium borohydride) is a starting material typically used to prepare borane compounds. Diborane ($B_2H_6$), for example, is prepared by reacting $NaBH_4$ with $BF_3$. Borohydride compounds (i.e. compounds containing the $BH_4$ anion or other anionic B—H groups) are generally prepared by reacting alkoxyborates with active metal hydrides e.g. NaH or $NaAlH_4$. Sodium borohydride itself ($NaBH_4$), for example, is commercially prepared using the known Schlessinger process, which involves reacting sodium hydride (NaH) with trimethoxyboron ($B(OCH_3)_3$). While convenient to practice on a small or intermediate laboratory or commercial scale, these reactions are not energy-efficient; the reaction of NaH with $B(OCH_3)_3$ is exothermic, and NaH is itself formed in the exothermic reaction of Na metal with $H_2$, so overall, about 22 kcal of heat are released per B—H bond that is formed.

Other means are known for forming $B_2H_6$. The best known is the reaction of $BCl_3$ with $H_2$ at high temperature to make $BHCl_2$ and HCl. Significant equilibrium conversion is possible only if the temperature is on the order of about 600 degrees Celsius or more, and the product mixture must be rapidly quenched, typically within a few seconds, to a temperature below about 100 degrees Celsius to allow $BHCl_2$ to disproportionate to $B_2H_6$ and $BCl_3$. The quenched mixture must be separated rapidly before the $B_2H_6$ back-reacts with the HCl coproduct. $BCl_3$ and HCl are both highly corrosive. Their corrosive properties in combination with the difficulties of heat management make this process costly to practice.

Presently, there is no energy efficient means available for preparing boranes.

Methods and systems that employ chemical compounds for storing and evolving hydrogen at ambient temperature with minimal heat input remain highly desirable.

SUMMARY OF THE INVENTION

In accordance with the purposes of the present invention, as embodied and broadly described herein, the present invention includes a method for synthesizing a $BH_3$-containing compound. The method involves synthesizing at least one halo-boron compound from a boron-containing precursor; reacting the at least one halo-boron compound with an inorganic hydride material, thereby generating at least one B—H compound; and disproportionating the at least one B—H compound to at least one $BH_3$-containing compound.

The invention also includes a method for making a metal hydride, comprising thermolyzing a reactive metal formate. The reactive metal hydride may be a compound of the formula

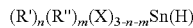

wherein R' is alkyl; wherein R" is aryl or aryl attached to a polymer backbone; wherein X is F, Cl, Br, or I; wherein n is 0, 1, 2, or 3; wherein m is 0, 1, 2, or 3; and wherein n+m≦3.

The invention also includes a method of forming $BH_3NH_3$ and related materials containing $BH_3$ and amine compounds. The method involves reacting monohydrido boron compound with a selected ligand whereby the monohydrido boron compound disproportionates to a $BH_3$-containing compound; and thereafter reacting the $BH_3$-containing compound with ammonia.

The invention also includes a method of forming halo-boron compounds suitable for reduction to boranes. The method involves reacting a boron compound selected from the group consisting of alcoholato-boron compounds, catecholato-boron compounds, amino-boron compounds, and anilino-boron compounds with a compound of the formula HX wherein X is selected from the group consisting of halogens; and thereafter separating a product halo-boron compound.

The invention also includes a method of forming halo-boron compounds suitable for reduction to boranes. The method involves reacting a boron compound selected from the group consisting of alcoholato-boron compounds, catecholato-boron compounds, amino-boron compounds, and anilino-boron compounds with an oxidizing agent, the oxidizing agent comprising a corresponding halo-boron compound or halide salt of the boron compound; and thereafter separating a product halo-boron compound.

The invention also includes a method for synthesizing a BH-containing compound. The method includes synthesizing at least one halo-boron compound from a boron-containing precursor; and reacting the at least halo-boron compound with an inorganic hydride material, thereby generating at least one B—H compound.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1a shows a part of the preparation where a silane (a material having a Si—H bond) is exposed to boron trichloride ($BCl_3$). FIG. 1b shows the formation of diborane and the conversion of the silane to a chlorosilane (a material having a Si—Cl bond), and FIG. 1c-d shows the electrochemical conversion of the chlorosilane back to the silane.

DETAILED DESCRIPTION

The present invention provides an energy efficient method for synthesizing boranes (i.e. boron compounds having at least one B—H bond) that are used for storing hydrogen. These boranes are prepared with considerably less heat of reaction than present methods. Related benefits are that boranes may be prepared at close to ambient temperature without the need for thermal quenching and rapid separation, and without the energy cost of generating active metal hydrides. Spent borane-based hydrogen storage material could be regenerated in neighborhood facilities, and the regenerated material redistributed for use as a transportation fuel. Using our invention, regeneration could require electrical power as the only consumed resource. The invention may enable widespread use of boranes for hydrogen storage for transportation.

The boranes synthesized by means of this invention may also be used as starting materials for conversion to borohydride compounds for subsequent use as chemical reducing agents or as chemical hydrogen storage media.

Figure 1:
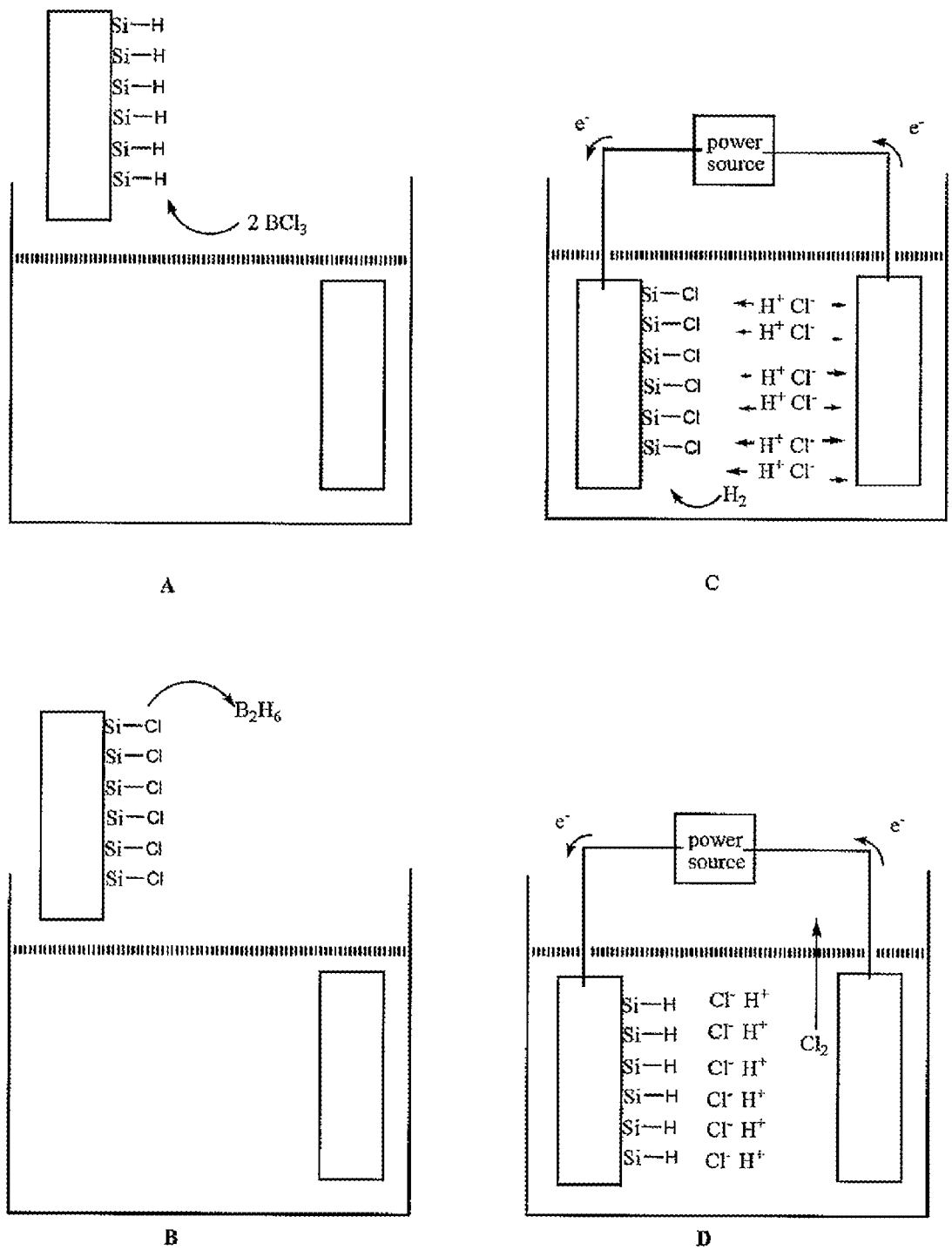
FIGS. 1a-d shows a schematic illustration of an embodiment for an energy efficient preparation of diborane ($B_2H_6$).

FIGS. 1a-d shows a schematic illustration of an embodiment of the invention that relates to the preparation of diborane ($B_2H_6$). FIG. 1a shows apart of the preparation where a silane (a Si—H material, i.e. a material with a silicon-hydrogen bond) is exposed to the halo-boron compound boron trichloride ($BCl_3$). FIG. 1b shows the formation of diborane and the conversion of the Si—H material to a halosilane (a Si—X material where X is a halogen). The halosilane shown in FIG. 1b is a chlorosilane (a Si—Cl material, i.e. a material having a Si—Cl bond). FIGS. 1c-d show the electrochemical conversion of the halosilane material back to a silane. In this embodiment, electrochemical energy provides the reducing potential to form the borane (diborane in this case), and a silicon-containing electrode essentially becomes an electrocatalyst for the process. In principle the energy consumed is close to the thermodynamic minimum required for forming boranes, and less energy is consumed using the invention than is used in known methods. This embodiment process approaches an efficiency that could make borane compounds practical for large-scale hydrogen storage for transportation.

The silane used with the embodiment shown in FIGS. 1a-d may be formed by, for example, immersing a high surface area silicon-containing electrode in a liquid medium that contains electroactive hydrogen (H) atoms (water, for example) and under a cathodic potential sufficient to result in the replacement of surface-capped groups on the silicon-containing electrode with hydrogen. The electrode is then dried under conditions such that the Si—H bonds remain on the surface, which may require exclusion of oxygen. The dry electrode is then exposed to $BCl_3$ as vapor or dissolved in an inert solvent. Diborane ($B_2H_6$) is formed and separated, and the silicon-containing electrode is re-hydrided.

It should be understood that other electrochemical reactions or processes may be used to convert halosilane back to silane.

It should also be understood that other materials that include but are not limited to, zinc, gallium, germanium, indium, cadmium, mercury, and mixtures thereof, may be used instead of silicon.

It should also be understood that other halo-boron compounds (i.e. compounds of boron that contain at least one boron-halogen bond) besides $BCl_3$ may be used. (Catecholato)BCl is an example of a halo-boron compound that may be easier to prepare from spent borane fuel. Passing (catecholato)BCl over the hydrided silicon electrode (as described previously for the $BCl_3$ embodiment) results in the conversion of (catecholato)BCl to (catecholato)BH. (Catecholato)BH may then be disproportionated (using triphenylphosphine, diethylaniline, or some other reagent capable of promoting the disproportionation), resulting in the formation of $BH_3$-containing compounds and $B_2$(catecholato)$_3$. To continue the process, the $B_2$(catecholato)$_3$ is converted back to (catecholato)BCl. The conversion of $B_2$(catecholato)$_3$ back to (catecholato)BCl may be accomplished by, for example, reacting $B_2$(catecholato)$_3$ with HCl at elevated temperature and separating the product catechol from the product (catecholato)BCl. This conversion may also be accomplished by reacting $B_2$(catecholato)$_3$ with chlorine (or another appropriate oxidant) to make (catecholato)BCl and quinone (an oxidation product of catechol).

Other halo-boron compounds that may be used include $(amino)_2BCl$ and $(amino)BCl_2$ where "amino" is an organic group containing a primary or secondary amine functionality bonded to the boron. Examples of such $(amino)_2BCl$ compounds include but are not limited to $(Me_2N)_2BCl$, (piperidino)$_2BCl$, ($NHCH_2CH_2NH$)BCl, (o-$NHC_6H_4NH$)BCl. These halo-boron compounds may react with a hydrided silicon electrode, or more generally with compounds having Si—H bonds (or Sn—H bonds, or H atoms bonded to zinc, gallium, germanium, indium, cadmium, or mercury) to form $(amino)_2BH$ compounds. The $(amino)_2BH$ compounds may then be disproportionated to form $BH_3$-containing compounds and $(amino)_3B$ compounds. To continue the process the $(amino)_3B$ compounds may be converted back to $(amino)_2BCl$ compounds by reacting them with HCl or with other acids, or with chlorine or other oxidants, and then separating the product $(amino)_2BCl$ compounds from the other reaction products, which may include the hydrochloride salt of the corresponding primary or secondary amine.

Figure 2:
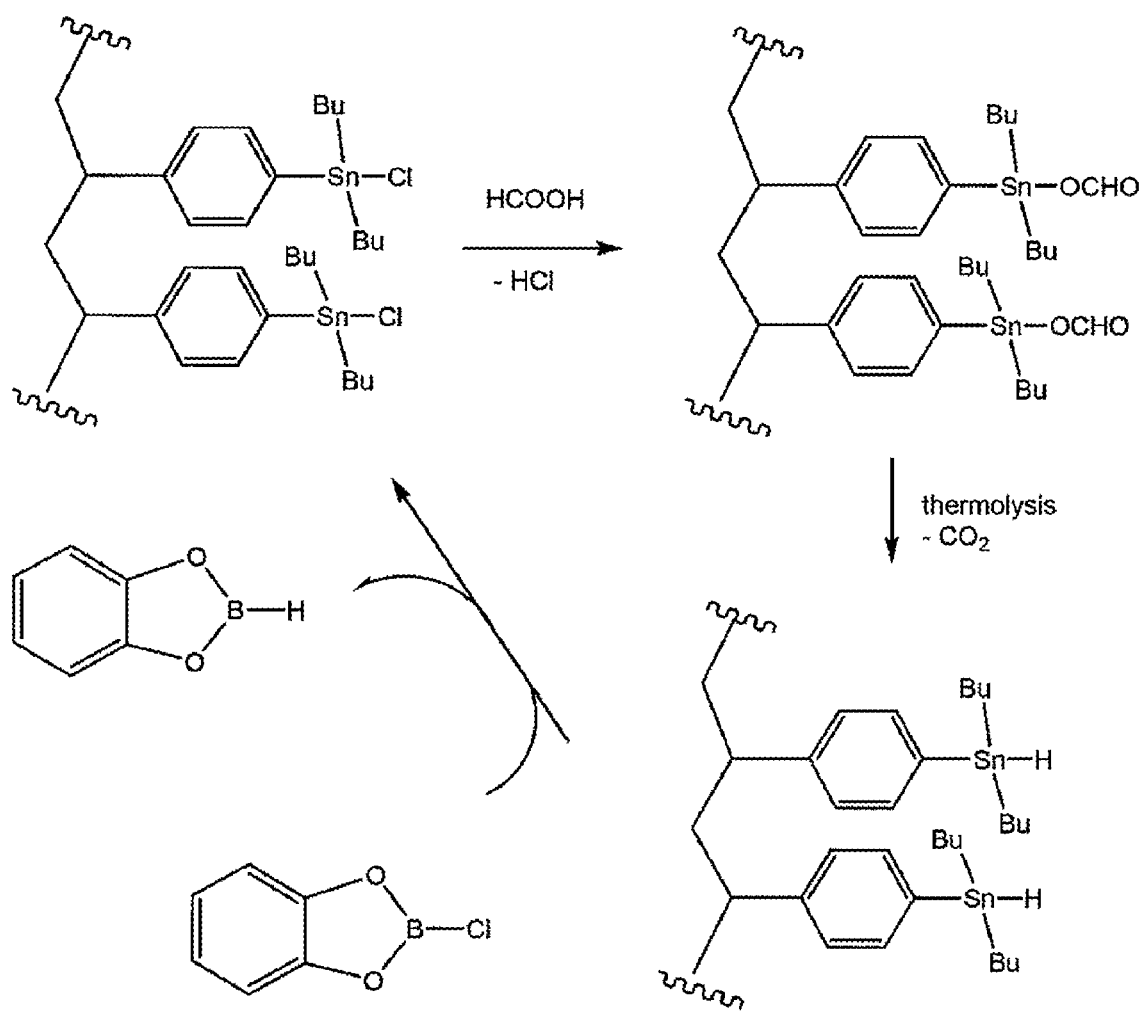
FIG. 2 shows a schematic illustration of an embodiment for an energy efficient preparation of (catecholato)BH using a polymer-supported tin reagent.

FIG. 2 shows a schematic illustration of an embodiment of the invention that is concerned with preparing (catecholato)BH. In this embodiment, a (aryl)(dialkyl)(chloro)tin group attached to a polymer backbone is reacted with formic acid to produce the corresponding polymer-bound (aryl)(dialkyl)(formato)tin material, which is thermolyzed to form $CO_2$ and the corresponding stannane, the polymer-bound (aryl)(dialkyl)(hydrido)tin material. (Catecholato)B—Cl reacts with the stannane to produce (catecholato)B—H and regenerate the polymer-bound (aryl)(dialkyl)(chloro)tin material.

In another embodiment, a stannane such as the polymer-supported tin reagent shown in FIG. 2 is used to convert $BCl_3$ to $B_2H_6$. The steps are similar. To convert $BCl_3$ to $B_2H_6$, the polymer-bound tin reagent is reacted with formic acid at room temperature to form hydrochloric acid (HCl) and the polymer bound (aryl)(dialkyl)(formato)tin material. The HCl that forms is used to convert spent borane fuel to $BCl_3$. The (aryl)(dialkyl)(formato)tin material is heated to a temperature in the range of from about 120 degrees Celsius to about 180 degrees Celsius to drive decarboxylation, releasing $CO_2$ and forming polymer-bound (aryl)(dialkyl)(hydrido)tin material and $CO_2$. The $CO_2$ released is reacted with $H_2$ to provide formic acid. The polymer-bound (aryl)(dialkyl)(hydrido)tin material is reacted with $BCl_3$ to make diborane and regenerate the polymer-bound (aryl)(dialkyl)(chloro)tin material. Because $CO_2$ and HCl can be recycled in the overall process, the net conversion is:

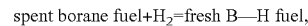

spent borane fuel+$H_2$=fresh B—H fuel, and the polymer-supported tin materials serve as recyclable process intermediates. Overall the net conversion is endothermic and requires energy, which is provided by the endothermic decarboxylation of the (aryl)(dialkyl)(formato)tin material at 120-180 degrees Celsius. This embodiment provides a significantly better process than the direct hydrogenation of $BCl_3$, which requires heating to about 600 degrees Celsius.

While FIG. 2 shows a single embodiment based on a polystyrene backbone, it should be understood that other polymer backbones may be used with the invention, including but not limited to, other polyalkenes (polyethylene, polypropylene, for example) polyethers, ROMP (ring opening metathesis polymerization) polymer products of cycloalkenes monomers, polysulfides, polyphosphazenes, polyborazenes, polyanilines, polysilanes, and branched, cross-linked, and alkyl- and aryl-substituted polymers and copolymers of these materials (cross-linked polyethylene, for example).

In a more general embodiment, halo-boron compounds (preferably B—Cl compounds) are reacted with stannanes (tributyltin hydride, for example) to convert the halo-boron compound to a borane. The stannane is converted to a halostannane (a tin compound having a tin-halogen bond, preferably a Sn—Cl bond). The stannane is regenerated by reacting the halo-stannane with an inorganic metal hydride. The stannane also can be regenerated by electrochemical means similar to the silicon-based route (vide supra), or by reacting the halo-stannane with formate to form a Sn-formate compound and then subsequently thermolyzing the Sn-formate compound.

Other stannanes (hydrided tin-containing electrodes, for example) may react with one or more halo-boron compounds to convert the halo-boron compounds to boranes and halostannanes. The halostannanes may be re-hydrided by formate exchange and thermolysis as above, or by electrochemical means (similar to the silicon-based route above) to form the stannanes.

Additional embodiments are provided in the following EXAMPLES.

Example 1

Triethylsilane (0.2 mL) was added to a solution of $BCl_3$ (0.2 g $BCl_3$ in 2 mL of $CD_2Cl_2$). The resulting solution was monitored by nuclear magnetic resonance (NMR) spectrometry. After 3 minutes all of the $BCl_3$ had reacted. The only boron-containing product present was $B_2H_6$.

Example 2

Tributyltinhydride (0.3 g) was added to a solution of $BCl_3$ (0.2 g in 2 mL of $CD_2Cl_2$). The resulting solution was monitored by NMR. After 30 minutes all of the $BCl_3$ was consumed and the only boron-containing product present was $B_2H_6$.

Example 3

A freshly prepared hydrided silicon surface was exposed to a solution of $BCl_3$ in hexanes. The solution was left in contact with the silicon surface for 30 minutes. Infrared analysis of the silicon surface indicated that the silicon hydrides were converted to silicon chlorides. By inference, the boron chloride was concerted to boron hydride.

Example 4

A freshly prepared hydrided silicon surface was exposed to a solution of $BBr_3$ in hexanes. The solution was left in contact with the silicon surface for 30 minutes. Infrared analysis of the silicon surface indicated the conversion of the silicon hydrides to silicon bromides. By inference, the boron bromide was converted to boron hydride.

Example 5

In a hypothetical example, an aminoborane is dehydrogenated and combined with a catechol ligand to form a product. This product is dissolved in a solvent to form a solution. Tributyltinhydride is added to the solution. There is a metathesis reaction between the tributyltinhydride and this dissolved product to form boron hydrides.

Example 6

In a hypothetical example, an aminoborane is dehydrogenated and combined with a catechol ligand to form a product. This product is dissolved in a solvent to form a solution. Triethylsilane is added to the solution. There is a metathesis reaction between the triethylsilane and this dissolved product to form boron hydrides.

Example 7

In a hypothetical example, an aminoborane is dehydrogenated and combined with a catechol ligand to form a product. This product is dissolved in a solvent to form a solution. A freshly hydrided piece of silicon is added to the solution. There is a metathesis reaction between the silicon hydride on the surface and this dissolved product to form boron hydrides.

Example 8

In a hypothetical example, an aminoborane is dehydrogenated and combined with a catechol ligand to form a product. This product is dissolved in a solvent to form a solution. A piece of titanium with a hydride surface is added to the solution. There is a metathesis reaction between the titanium hydride and this dissolved product to form boron hydrides.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for making a tin hydride, comprising reacting a halo-stannane with a formate to form a Sn-formate compound and then subsequently thermolyzing the Sn-formate compound, wherein the tin hydride is a compound of the formula $$(R')_n(R'')_m(X)_{3-n-m}Sn(H)$$

wherein R' is alkyl, wherein R" is aryl attached to a polymer backbone, wherein X is F, Cl, Br, or I; wherein n is 0, 1, 2, or 3; wherein m is 0, 1, 2, or 3; and wherein n+m≦3.

2. The method of claim 1, wherein the tin hydride is a compound of the formula selected from the group consisting of $R_3SnH$, $R_2XSnH$, $RX_2SnH$, and $X_3SnH$, wherein R is selected from alkyl and aryl, and wherein X is selected from halogen.

3. A method of forming halo-boron compounds suitable for reduction to boranes, comprising:

reacting a boron compound selected from the group consisting of alcoholato-boron compounds, catecholato-boron compounds, amino-boron compounds, and anilino-boron compounds with a compound of the formula HX wherein X is selected from the group consisting of halogens, where "amino" is an organic group containing a primary or secondary amine functionality bonded to the boron; and thereafter separating a product halo-boron compound.

4. A method of forming halo-boron compounds suitable for reduction to boranes, comprising:

reacting a boron compound selected from the group consisting of alcoholato-boron compounds, catecholato-boron compounds, amino-boron compounds, and anilino-boron compounds with an oxidizing agent, where "amino" is an organic group containing a primary or secondary amine functionality bonded to the boron the oxidizing agent comprising a corresponding halo-boron compound or halide salt of the boron compound; and thereafter separating a product halo-boron compound.

* * * * *